(12) United States Patent
Matsuda et al.

(10) Patent No.: US 10,705,010 B2
(45) Date of Patent: Jul. 7, 2020

(54) PARTICLE COUNTER

(71) Applicant: RION Co., Ltd., Tokyo (JP)

(72) Inventors: Tomonobu Matsuda, Tokyo (JP); Masaki Shimmura, Tokyo (JP); Mitsuaki Saitou, Tokyo (JP); Yuki Yamakawa, Tokyo (JP)

(73) Assignee: RION Co., Ltd., Tokyo (JP)

( * ) Notice: Subject to any disclaimer, the term of this patent is extended or adjusted under 35 U.S.C. 154(b) by 0 days.

(21) Appl. No.: 16/290,788

(22) Filed: Mar. 1, 2019

(65) Prior Publication Data
US 2019/0277745 A1 Sep. 12, 2019

(30) Foreign Application Priority Data

Mar. 9, 2018 (JP) .................. 2018-043571

(51) Int. Cl.
G01N 15/14 (2006.01)
G01N 15/02 (2006.01)
(Continued)

(52) U.S. Cl.
CPC ..... *G01N 15/1434* (2013.01); *G01N 15/0205* (2013.01); *G01N 15/06* (2013.01); *G01N 15/1459* (2013.01); *G01N 2015/0053* (2013.01); *G01N 2015/0693* (2013.01); *G01N 2015/1454* (2013.01); *G01N 2015/1486* (2013.01); *G01N 2015/1493* (2013.01)

(58) Field of Classification Search
CPC ........... G01N 15/0205; G01N 15/1429; G01N 15/1434; G01N 21/45; G01N 2015/1454; G01N 2015/1486; G01N 2015/1488; G01N 2015/1493; G01B 9/02024; G01B 9/02038; G01B 2290/35; G01B 2290/40
See application file for complete search history.

(56) References Cited

U.S. PATENT DOCUMENTS 6,201,608 B1 * 3/2001 Mandella .............. A61B 3/102
356/491
6,587,206 B1 * 7/2003 Dogariu ................. G01N 15/04
356/479

(Continued)

FOREIGN PATENT DOCUMENTS

JP 2003270120 A 9/2003
JP 2007114160 A * 5/2007
JP 5859154 B1 2/2016

*Primary Examiner* — Michael A Lyons
(74) *Attorney, Agent, or Firm* — Rankin, Hill & Clark LLP

(57) ABSTRACT

A particle counter includes a detector that receives, using a light receiving element, interference light between scattered light and reference light, generates a detection signal corresponding to the interference light, and amplifies the detection signal using an amplifier; a counting unit that performs counting of the particle, based on the detection signal in a measurement period for measuring particle; and an optical path length variable unit that causes the optical path length of at least one of a first optical path and a second optical path to be changed at a predetermined rate, wherein the predetermined rate is set based on a flow velocity of the fluid so as to slow a change in a phase difference between the scattered light and the reference light and to make the frequency of the detection signal lower by changing the optical path length.

6 Claims, 10 Drawing Sheets

(51) Int. Cl.
 *G01N 15/06* (2006.01)
 *G01N 15/00* (2006.01)

(56) References Cited

U.S. PATENT DOCUMENTS

| | | | |
|---|---|---|---|
| 8,958,067 B2* | 2/2015 | Shimmura | G01N 15/1429 |
| | | | 356/343 |
| 9,983,113 B2* | 5/2018 | Matsuda | G01B 9/02024 |
| 10,416,069 B2* | 9/2019 | Saitou | G01N 15/1434 |
| 2011/0001969 A1* | 1/2011 | Ishii | G01J 3/4412 |
| | | | 356/337 |
| 2014/0152986 A1* | 6/2014 | Trainer | G01N 15/0205 |
| | | | 356/336 |
| 2014/0336990 A1* | 11/2014 | Iwai | G01N 15/0211 |
| | | | 702/189 |
| 2016/0091407 A1* | 3/2016 | Minakami | G01N 21/53 |
| | | | 356/338 |
| 2018/0038781 A1 | 2/2018 | Matsuda | |
| 2018/0259441 A1* | 9/2018 | Johnson | G01N 15/0227 |

* cited by examiner

PARTICLE COUNTER

CROSS-REFERENCE TO RELATED APPLICATION

This application claims priority from Japanese Patent Application No. 2018-043571 filed with the Japan Patent Office on Mar. 9, 2018, the entire contents of which are hereby incorporated by reference.

BACKGROUND ART

1. Technical Field

The present disclosure relates to a particle counter.

2. Related Art

A particle counter is a device for measuring particles in a fluid which includes liquids, such as chemical solutions and water, and gases, such as air. In a certain particle counter, light from a light source is separated into irradiating light and reference light, and a fluid containing particles is irradiated with the irradiating light. Then, scattered light from the particles due to the irradiating light is caused to interfere with reference light, and the particles are counted for each particle size, based on the interference light (see Japanese Patent No. 5859154, for example).

SUMMARY

A particle counter includes a light source that emits light; a light superimposing unit that spatially superimposes two lights; an irradiation optical system that forms a detection area by irradiating a fluid flowing in a flow passage with a first light among a plurality of lights obtained by branching the light from the light source; a detection optical system that causes scattered light, among scattered light from a particle included in the fluid in the detection area, that is in a direction different from an optical axis of the irradiation optical system to enter the light superimposing unit; a reference optical system that causes a second light among the plurality of lights to enter the light superimposing unit as reference light; a detector that receives, using a light receiving element, interference light between the scattered light and the reference light obtained by the light superimposing unit, generates a detection signal corresponding to the interference light, and amplifies the detection signal using an amplifier; a counting unit that performs counting of the particle, based on the detection signal in a measurement period for measuring the particle; and an optical path length variable unit that causes the optical path length of at least one of a first optical path which is an optical path of the first light and the scattered light and a second optical path which is an optical path of the second light to be changed at a predetermined rate, wherein the predetermined rate is set based on a flow velocity of the fluid so as to slow a change in a phase difference between the scattered light and the reference light and to make the frequency of the detection signal lower by changing the optical path length.

DETAILED DESCRIPTION

Figure 1:
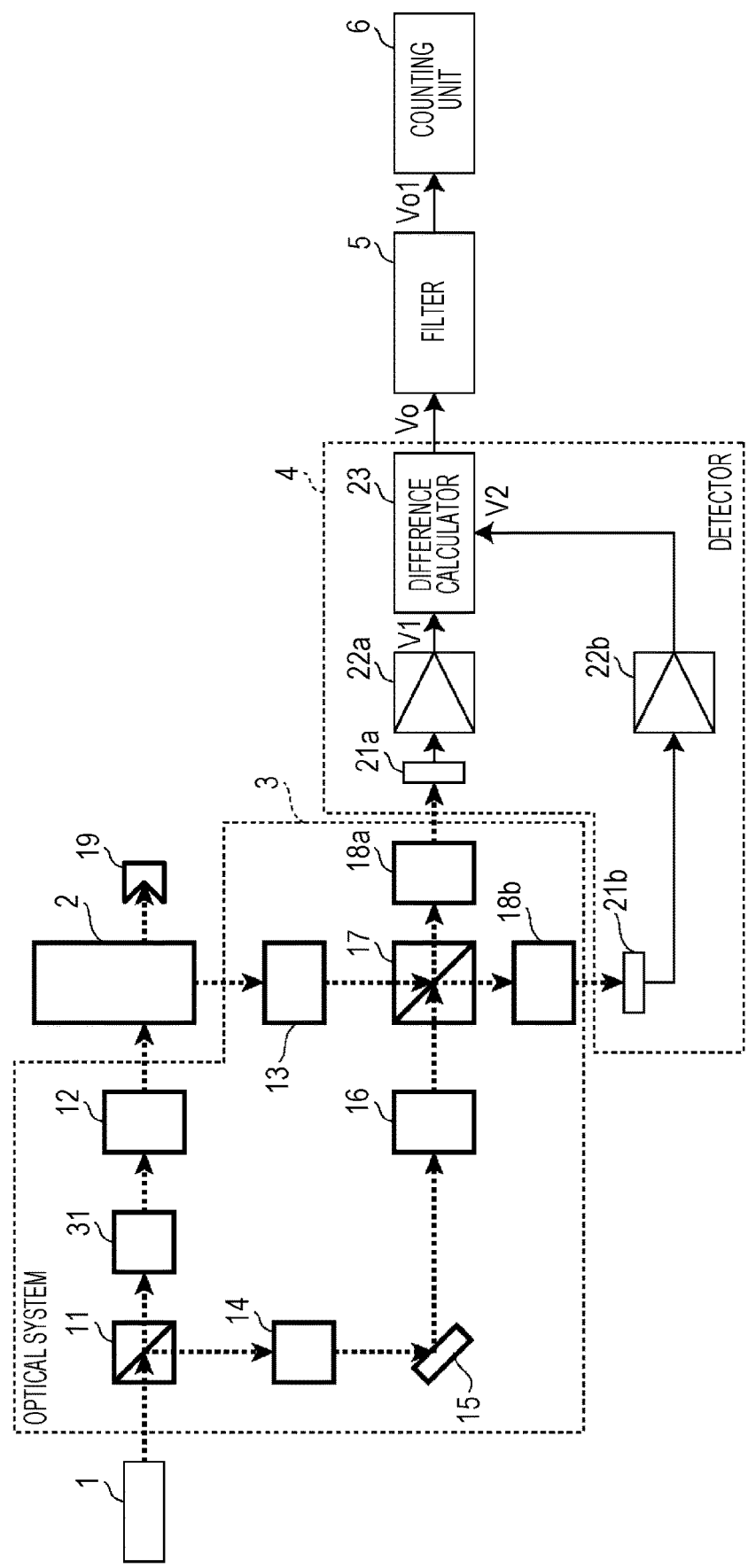
FIG. 1 is a block diagram of a configuration of a particle counter according to a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

When particles are counted based on interference light, the interference light is received by a semiconductor light receiving element, such as a photodiode. A detection signal corresponding to the interference light is generated by photoelectric conversion. The detection signal is amplified by an amplifier in a stage subsequent to the semiconductor light receiving element. Then, the particles are counted based on the detection signal that has been amplified.

Meanwhile, an intensity change of the interference light due to the scattered light from the particles and the reference light (i.e., variation in the brightness of the interference light that corresponds to the frequency of the detection signal) depends on the rate of movement (i.e., flow velocity of the sample fluid) of the particles. For example, in order to measure a predetermined amount of sample fluid in a shorter time, the flow velocity of the sample fluid is increased, resulting in a higher frequency of the detection signal.

Accordingly, when the flow velocity of the sample fluid is high and the frequency of the detection signal is high, the amplitude level of the detection signal decreases due to the frequency characteristics of the semiconductor light receiving element and/or the amplifier. This may result in a failure to count the particles accurately.

An object of the present disclosure is to provide a particle counter with which it is possible to perform accurate particle counting even when the flow velocity of the sample fluid is made relatively high.

A particle counter of an aspect according to the present disclosure includes a light source that emits light; a light superimposing unit that spatially superimposes two lights; an irradiation optical system that forms a detection area by irradiating a fluid flowing in a flow passage with a first light among a plurality of lights obtained by branching the light from the light source; a detection optical system that causes scattered light, among scattered light from a particle included in the fluid in the detection area, that is in a direction different from an optical axis of the irradiation optical system to enter the light superimposing unit; a reference optical system that causes a second light among the plurality of lights to enter the light superimposing unit as reference light; a detector that receives, using a light receiving element, interference light between the scattered light and the reference light obtained by the light superimposing unit, generates a detection signal corresponding to the interference light, and amplifies the detection signal using an amplifier; a counting unit that performs counting of the particle, based on the detection signal in a measurement period for measuring the particle; and an optical path length variable unit that causes the optical path length of at least one of a first optical path which is an optical path of the first light and the scattered light and a second optical path which is an optical path of the second light to be changed at a predetermined rate. In addition, the predetermined rate is set based on a flow velocity of the fluid so as to slow a change in a phase difference between the scattered light and the reference light and to make the frequency of the detection signal lower by changing the optical path length.

The particle counter according to the above aspect of the present disclosure is capable of performing accurate particle counting even when the flow velocity of the sample fluid is made relatively high.

In the following, embodiments of the present disclosure will be described with reference to the drawings.

First Embodiment

FIG. 1 is a block diagram of a configuration of a particle counter according to a first embodiment of the present disclosure. The particle counter illustrated in FIG. 1 is provided with a light source 1, a flow cell 2, an optical system 3, a detector 4, a filter 5, and a counting unit 6.

The light source 1 is a light source that emits light (herein, laser light) of a predetermined wavelength. In the present embodiment, the light source 1 emits high-coherent light in a single longitudinal mode. For example, as the light source 1, a laser light source having a wavelength of 532 nm and an output of the order of 500 mW is used.

The flow cell 2 forms a flow passage for a fluid containing particles to be counted. In the embodiment, the fluid containing particles to be counted is a liquid.

Figure 2:
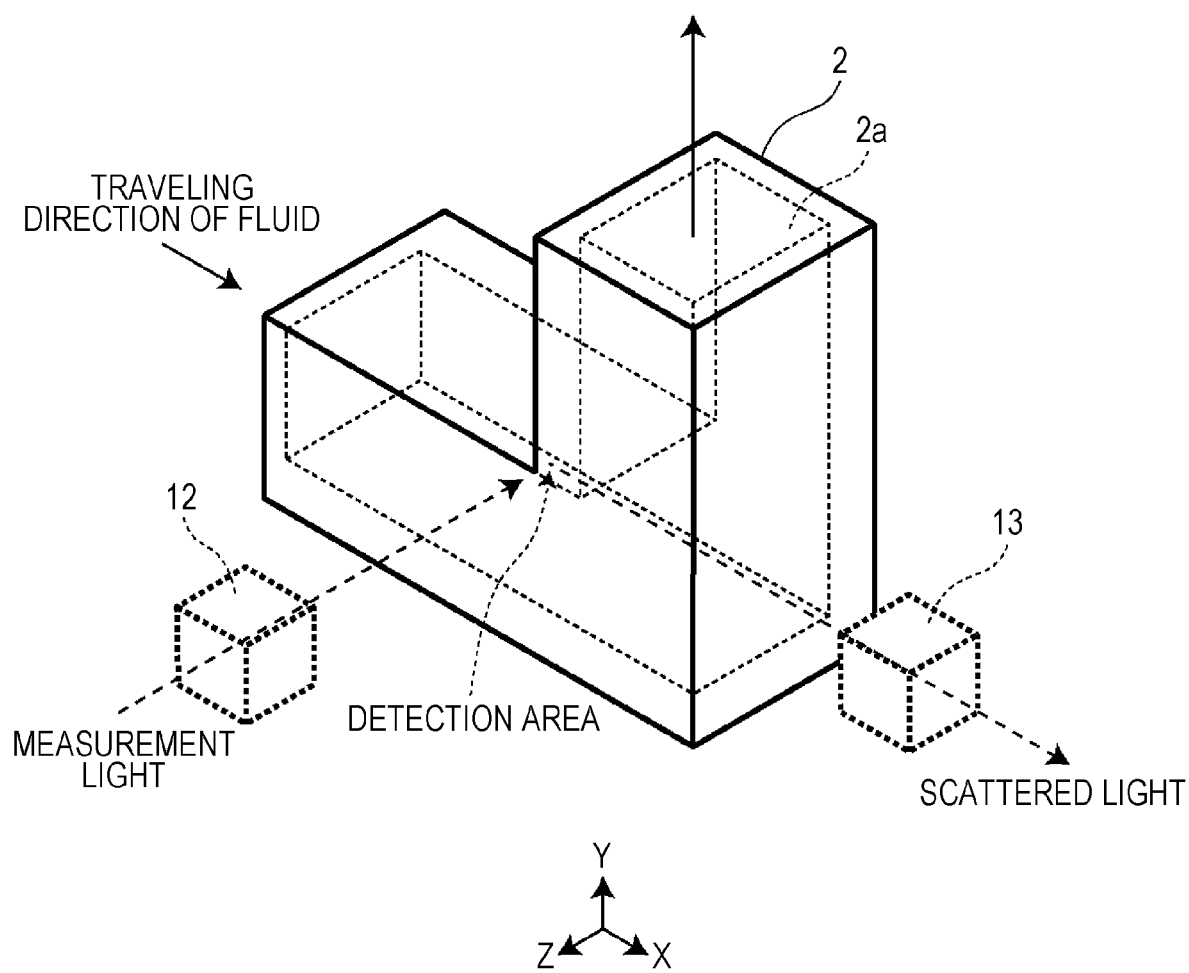
FIG. 2 is a perspective view of an example of a flow cell in FIG. 1.

FIG. 2 is a perspective view of an example of the flow cell 2 in FIG. 1. As illustrated in FIG. 2, the flow cell 2 is bent in L-shape. The flow cell 2 is a transparent tubular member forming a bent flow passage 2a. When the fluid containing the particles to be counted is a strongly acidic or strongly alkaline chemical solution, the flow cell 2 is made of sapphire, for example.

In the flow cell 2, the fluid flowing in the flow passage 2a is irradiated with one light among lights obtained by branching a light from the light source 1, to form a detection area.

The optical system 3 is provided with a beam splitter 11, an irradiation optical system 12, a detection optical system 13, an attenuator 14, a mirror 15, a beam expander 16, a beam splitter 17, condensers 18a and 18b, and an optical path length variable unit 31.

The beam splitter 11 branches the light from the light source 1 into two lights (first light and second light). The first light is caused to enter the irradiation optical system 12 as measurement light. The second light is caused to enter the attenuator 14 as reference light. For example, the beam splitter 11 branches the light from the light source 1 at a predetermined unequal ratio (for example, 90:10). The measurement light has an intensity greater than an intensity of the reference light.

The irradiation optical system 12 irradiates the fluid flowing in the flow passage 2a with the measurement light from a direction (in this example, the vertical direction, namely, a Z direction in FIG. 2) different from a traveling direction of the fluid in the flow passage 2a of the flow cell 2 (an X direction in FIG. 2). The irradiation optical system 12 uses a lens group as described in JP-A-2003-270120, for example, to shape the laser beam in such a manner as to enhance its energy density.

The detection optical system 13 makes the scattered light from the particles in the flow passage 2a by the foregoing irradiation with the measurement light enter a predetermined incident surface of the beam splitter 17. For example, the detection optical system 13 uses a condensing lens or an optical system including a pin hole for blocking background light and condensing lenses arranged on the front and rear stages of the pin hole.

In the embodiment, the measurement light enters the flow passage 2a from a direction different from the optical axis of the detection optical system 13. Accordingly, the detection optical system 13 makes the scattered light of side scattering enter the beam splitter 17.

Figure 3:
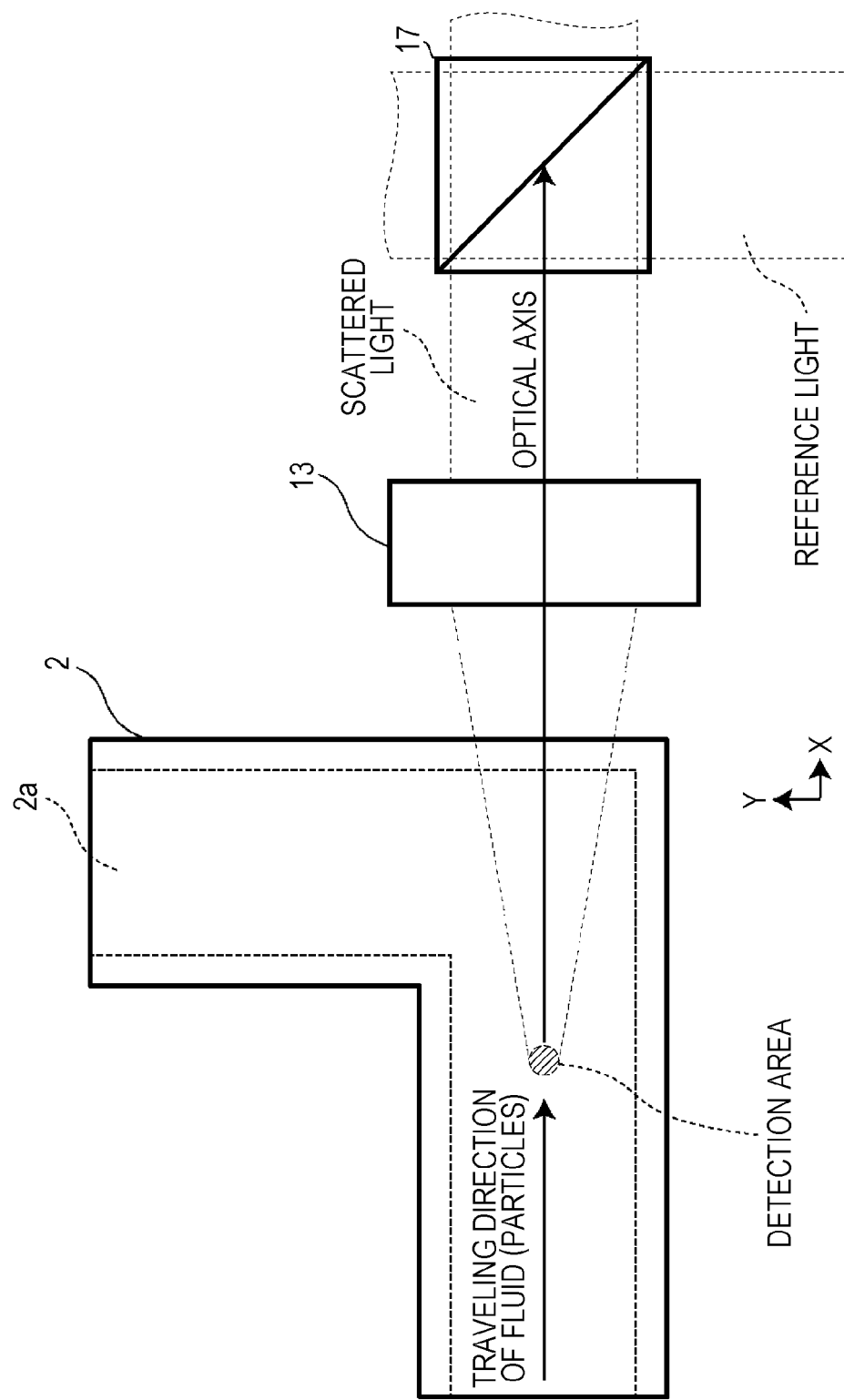
FIG. 3 is a diagram for describing an arrangement of the flow cell, a detection optical system, and a beam splitter in FIG. 1.

FIG. 3 is a drawing for describing the arrangement of the flow cell 2, the detection optical system 13, and the beam splitter 17 illustrated in FIG. 1. Specifically, as illustrated in FIG. 3, the detection optical system 13 makes a scattered light emitted along the traveling direction of the fluid (i.e., the particles) in the detection area enter the beam splitter 17 among scattered lights emitted from the particles and the fluid in the flow passage 2a.

In the embodiment, as illustrated in FIG. 3, the traveling direction of the fluid (i.e., the particles) is identical to the direction of the optical axis of the detection optical system 13. The scattered light within a predetermined solid angle from the center of the detection area enters the beam splitter 17.

Meanwhile, the reference light branched by the beam splitter 11 enters the attenuator 14.

The attenuator 14 attenuates the intensity of the light at a predetermined ratio. As the attenuator 14, a neutral density (ND) filter is used, for example. The mirror 15 reflects the reference light emitted from the attenuator 14 and makes the reference light enter the beam expander 16. For example, the beam splitter 11 and the attenuator 14 configure the intensity of the reference light to be approximately one ten thousandth of the intensity of the light emitted from the light source 1. The intensity of the reference light that enters the beam splitter 17 is set according to the particle size of the particles to be counted, the intensity of the scattered light, and the like. The attenuation rate of the attenuator 14 and the like are set to achieve the intensity of the reference light.

The beam expander 16 enlarges a beam diameter of the reference light to a predetermined diameter. The beam expander 16 employs the reference light with the enlarged beam diameter as an approximately parallel light and makes the approximately parallel light enter a predetermined incident surface (an incident surface different from the incident surface of the scattered light) of the beam splitter 17.

In the present embodiment, the detection optical system 13, the mirror 15, and the beam expander 16 are set such that, in the beam splitter 17, the wavefront shape of the scattered light of a particle and the wavefront shape of the reference light are substantially matched with each other. In the present embodiment, the detection optical system 13 and the beam expander 16 respectively emit the scattered light and the reference light as approximately parallel light. The wavefront shapes of the scattered light and the reference light may be curved.

In addition, the detection optical system 13, the mirror 15, and the beam expander 16 are configured such that their polarizing angles at the beam splitter 17 match with one another.

Thus, in the embodiment, to further enhance the degree of interference, the attenuator 14, the mirror 15, the beam expander 16, and others are set in the optical path of the reference light to control the intensity, a polarizing angle, and a wavefront shape of the reference light.

The beam splitter 17 causes the scattered light incident thereon and the reference light incident thereon to be superimposed spatially upon each other, so as to interfere with each other constructively or destructively. In this embodiment, the beam splitter 17 is provided separately from the beam splitter 11. In the beam splitter 17, in accordance with a change in optical path length due to the movement of the particles in the detection area, a phase difference between the scattered light and the reference light changes. In addition, due to light transmitted through or reflected by the beam splitter 17 itself, the intensity of the interference lights changes, as will be described later. The intensity of the interference light changes at the period (i.e., frequency) of the change in phase difference between the scattered light and the reference light corresponding to the velocity of the fluid (i.e., particles) in the traveling direction in the detection area. In a period in which the scattered light due to the particles is not incident, the beam splitter 17 emits a transmitted component of scattered light due to the fluid and a reflected component of the reference light interfering with each other, and a reflected component of the scattered light due to the fluid and a transmitted component of the reference light interfering with each other. In this case, the molecules of the fluid are very small and extremely large in number. Accordingly, the scattered light is random and the intensity change of the interference light is small compared to the change due to the particles.

The condenser 18a condenses light emitted from one emission surface of the beam splitter 17 and makes the light enter a light receiving element 21a. The condenser 18b condenses the light emitted from another emission surface of the beam splitter 17 and makes the light enter the light receiving element 21b. As the condensers 18a and 18b, condensing lenses are used, for example.

Figure 4:
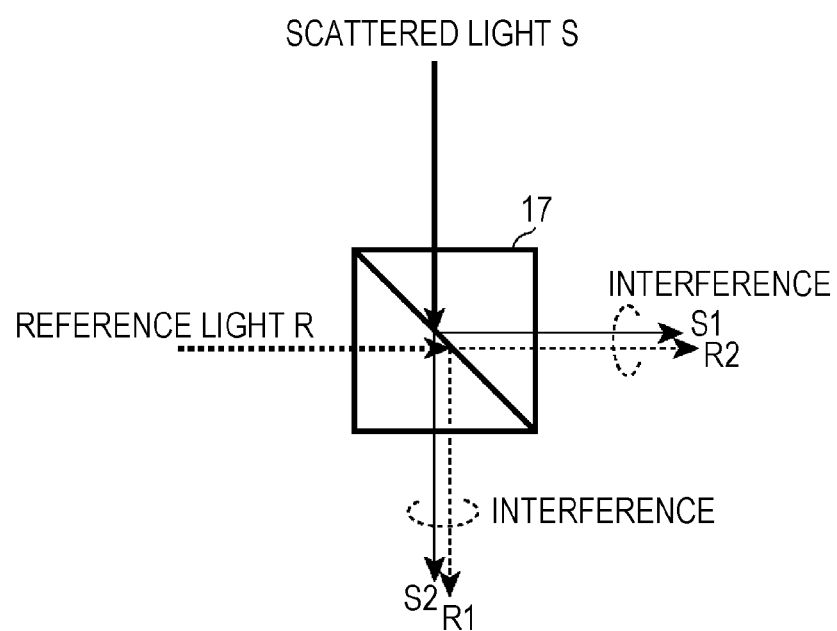
FIG. 4 is a diagram for describing superimposition of light in the beam splitter in FIG. 1.

FIG. 4 is a diagram for describing the superimposition of light in the beam splitter 17 of FIG. 1. As illustrated in FIG. 4, scattered light S and reference light R enter the beam splitter 17 in such a way that the optical axis of a reflected component S1 of the scattered light S and the optical axis of a transmitted component R2 of the reference light R are aligned with each other, and such that the optical axis of a transmitted component S2 of the scattered light S and the optical axis of a reflected component R1 of the reference light R are aligned with each other. Accordingly, the beam splitter 17 emits first interference light due to the reflected component S1 of the scattered light S and the transmitted component R2 of the reference light R, and second interference light due to the transmitted component S2 of the scattered light S and the reflected component R1 of the reference light R. The first interference light and the second interference light respectively enter light receiving elements 21a and 21b of the detector 4 via condensers 18a and 18b.

The scattered light S and the reference light R respectively enter a light branching surface of the beam splitter 17 at approximately 45 degrees. The transmitted components S2 and R2 respectively have the same phases as those of the scattered light S and the reference light R. The phases of the reflected components S1 and R1 respectively lag by 90 degrees with respect to the scattered light S and reference light R. Accordingly, an intensity change of the first interference light and an intensity change of the second interference light are opposite in phase, as will be described later.

In addition, preferably, the ratio of the transmitted component to the reflected component in the beam splitter 17 is 50:50. However, the ratio may be unequal such as 60:40. When the ratio of the transmitted component to the reflected component in the beam splitter 17 is unequal, the gains of amplifiers 22a and 22b are set according to the ratio such that the transmitted component of the reference light in an electrical signal V1 and the reflected component of the reference light in an electrical signal V2 become equal.

A beam damper 19 absorbs the light having passed through the flow cell 2. This ensures restraining the influence on the optical system 3 caused by irregular light reflection, leakage, and others of the light having passed through the flow cell 2.

The optical path length variable unit 31, during a measurement period which will be described later, causes at least one of a first optical path length of the optical path (first optical path) of the measurement light and scattered light, and a second optical path length of the optical path (second optical path) of the reference light to be changed at a predetermined rate which will be described later. In the first embodiment, the optical path length variable unit 31 causes the first optical path length to be changed at a predetermined rate during the measurement period. For example, when the first optical path length is not changed by the optical path length variable unit 31, in the beam splitter 17 serving as a light superimposing unit, the phase difference between the phase of the scattered light due to the particles and the phase of the reference light occurs in accordance with the movement of the particles, where the rate of movement of the particles and the rate of change in phase (i.e., the rate of change in the intensity of the interference light) are proportional. When the particles travel toward the beam splitter 17, by changing, using the optical path length variable unit 31, the first optical path length to become longer at a rate lower than the rate of movement of the particles, it becomes possible to decrease the rate of change in the phase difference between the phase of the scattered light due to the particles and the phase of the reference light. Or, by changing, using the optical path length variable unit 31, the second optical path length to become shorter at a rate lower than the rate of movement of the particles, it becomes possible to decrease the rate of change in the phase difference between the phase of the scattered light due to the particles and the phase of the reference light.

Specifically, as illustrated in FIG. 3, when the scattered light is received in the same direction as the traveling direction of the fluid (i.e., particles), the optical path length variable unit 31 increases the first optical path length at a predetermined rate. On the other hand, when the scattered light is received in the opposite direction from the traveling direction of the fluid (i.e., particles), the optical path length variable unit 31 decreases the first optical path length at a predetermined rate. When the second optical path length is changed at a predetermined rate, the same effect can be obtained by increasing or decreasing the second optical path length in the opposite manner.

Figure 5:
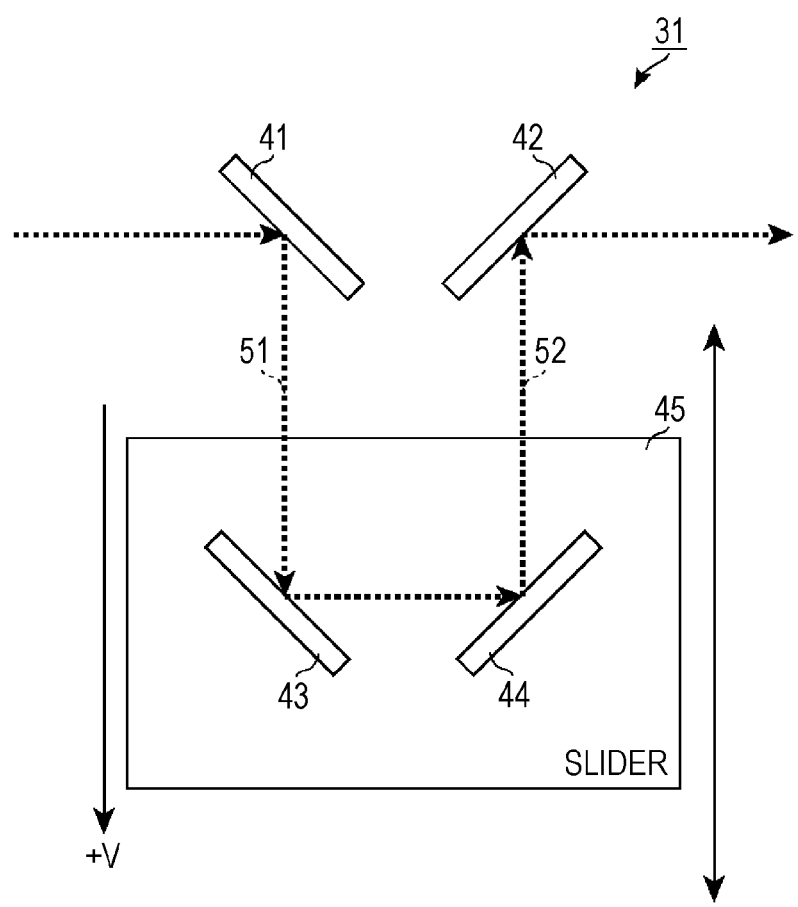
FIG. 5 illustrates an example of an optical path length variable unit in FIG. 1.

FIG. 5 illustrates an example of the optical path length variable unit 31 in FIG. 1. As illustrated in FIG. 5, the optical path length variable unit 31 is provided with two fixed reflective surfaces 41, 42 arranged in the first optical path, and a slider 45 including two movable reflective surfaces 43, 44.

In the first embodiment, each of the fixed reflective surfaces 41, 42 and the movable reflective surfaces 43, 44 is formed of a flat-plate mirror member. The fixed reflective surfaces 41, 42 and the movable reflective surfaces 43, 44 are arranged such that the measurement light has an incident angle of 45 degrees relative to the reflective surfaces. Reflection by the reflective surfaces 41, 42, 43, 44 is utilized to change the first optical path length. Specifically, as will be described later, the slider 45, during the measurement period, causes the two movable reflective surfaces 43, 44 to be moved in such a way that the first optical path length is changed at a predetermined rate.

Figure 6:
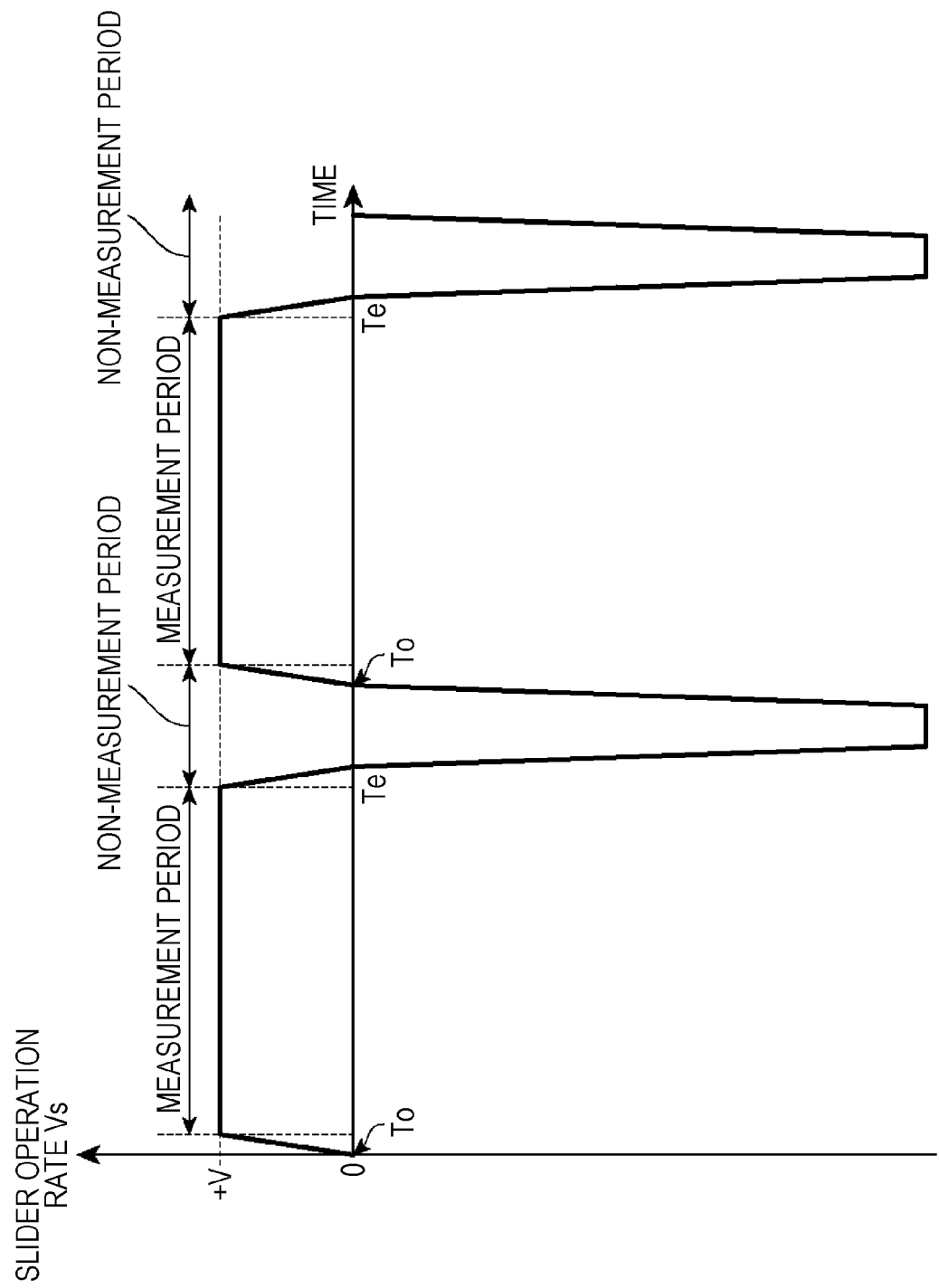
FIG. 6 is a diagram for describing the operation rate of a slider in FIG. 5.

FIG. 6 is a diagram for describing the operation rate Vs of the slider 45 in FIG. 5. Specifically, as illustrated in FIG. 6, the slider 45 starts (time To) to move the movable reflective surfaces 43, 44 from a reference position. The slider 45, during the measurement period, causes the movable reflective surfaces 43, 44 to be moved at a predetermined rate+V. When the measurement period comes to an end (time Te), the slider 45, during a non-measurement period, causes the movable reflective surfaces 43, 44 to be moved in the opposite direction at a rate higher than the predetermined rate+V and to return to the reference position. In this way, the slider 45 causes the movable reflective surfaces 43, 44 to reciprocate.

The detector 4 receives the interference lights from the beam splitter 17 with the light receiving elements 21*a* and 21*b*. The detector 4 generates a detection signal Vo corresponding to a difference between the interference lights. In the present embodiment, as illustrated in FIG. 1, the detector 4 is provided with the light receiving elements 21*a* and 21*b*, the amplifiers 22*a* and 22*b*, and a difference calculator 23.

The light receiving elements 21*a*, 21*b* are semiconductor light receiving elements, such as photodiodes and phototransistors, and each output an electric signal corresponding to the incident light. The amplifiers 22*a*, 22*b* amplify, with a predetermined gain, the electric signals output from the light receiving elements 21*a*, 21*b*. Herein, the amplifiers 22*a*, 22*b* are transimpedance amplifiers. The amplifiers 22*a*, 22*b* generate output voltages corresponding to output currents from the light receiving elements 21*a*, 21*b*.

The difference calculator 23 calculates the difference between the electric signal V1 obtained by the light receiving element 21*a* and corresponding to the first interference light, and the electric signal V2 obtained by the light receiving element 21*b* and corresponding to the second interference light. The difference calculator 23 outputs the difference as the detection signal Vo.

In a state where a scattered light component due to the particles is not contained (the scattered light component due to the fluid and a reference light component), the gains of the amplifiers 22*a* and 22*b* are adjusted such that a voltage of the electrical signal V1 becomes identical to a voltage of the electrical signal V2. Instead, one of the amplifiers 22*a* and 22*b* may be disposed and the gain of the amplifier may be adjusted so as to match both of the foregoing voltages. In the case where the voltage of the electrical signal of the light receiving element 21*a* is identical to the voltage of the electrical signal of the light receiving element 21*b*, the amplifiers 22*a* and 22*b* may be omitted.

Figure 7:
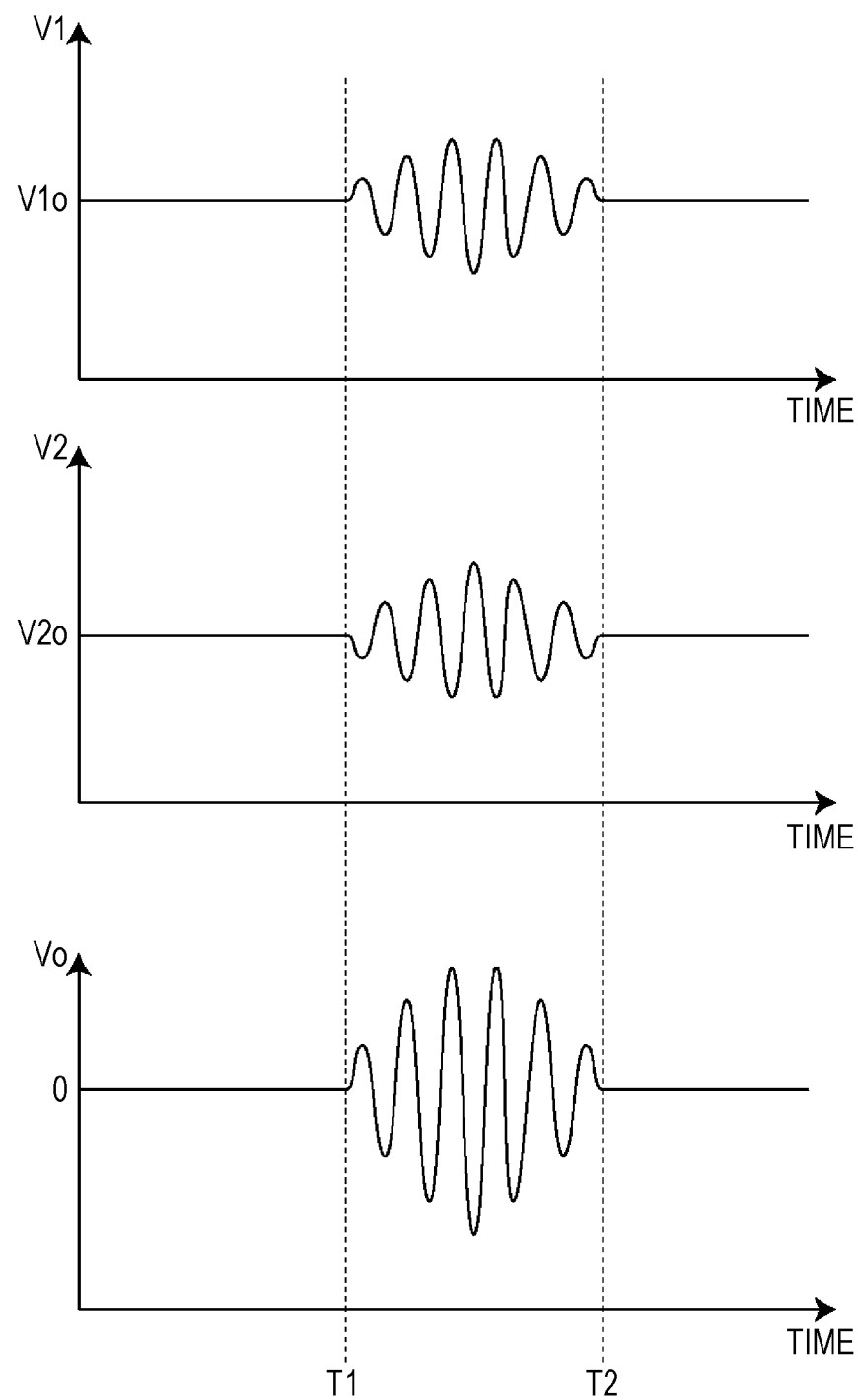
FIG. 7 is a timing chart for describing a detection signal obtained by a detector in FIG. 1.

FIG. 7 is a timing chart describing the detection signal obtained by the detector 4 illustrated FIG. 1.

When a certain particle passes through the detection area during a period of time T1 to time T2, a scattered light is generated due to the particles in that period. Then, as the particle moves in the traveling direction in the detection area, the optical path length from the particle to the light branch surface of the beam splitter 17 changes. Accordingly, the phase difference between the scattered light due to the particles and the reference light changes. The intensity of the interference light (amplitude) changes to strengthen or weaken mutually.

Accordingly, as illustrated in FIG. 7, the electrical signal V1 varies, in a period in which the particle passes through the detection area, positively or negatively with reference to a voltage V1$o$ in a particle-absent state, depending on the degree of interference. Similarly, the electrical signal V2 varies, in a period in which the particle passes through the detection area, positively or negatively with reference to a voltage V2$o$ in the particle-absent state, depending on the degree of interference. The alternating-current components of the electrical signals V1 and V2 in that period are opposite in phase to each other.

The reference voltages V1$o$ and V2$o$ of the electrical signals V1 and V2 output from the amplifiers 22*a* and 22*b* are equal to one another. Accordingly, as illustrated in FIG. 7, the detection signal Vo obtained by the difference calculator 23 has an Alternating-current component with a amplitude greater (about double) than that of the Alternating-current component resulting from the interferences of the respective electrical signals V1 and V2 in the period during which the particles pass through the detection area. The detection signal Vo has a voltage of almost zero except for the period.

In the present embodiment, the scattered light emitted along the traveling direction of the fluid in the detection area is detected. In this way, the change in optical path length when the particles pass through the detection area is increased. However, the direction of detection of the scattered light is not limited as long as the scattered light can be detected.

The scattered light (background light) from the liquid as a fluid medium is generated in the entire detection area. Further, background lights from different positions are also present. However, the background lights are canceled out by the difference calculation. Accordingly, the Alternating-current component of the detection signal Vo resulting from the interference of the background light is smaller than the Alternating-current component resulting from the interference of the scattered light due to the particles.

In this embodiment, the particle size of the particles to be counted is smaller than the wavelength of the light emitted from the light source 1. Accordingly, the intensity of the scattered light due to Rayleigh scattering is proportional to the sixth power of the particle size. On the other hand, the intensity of the interference light between the scattered light and the reference light is based on a relational expression ($I = 0.5 \cdot c \cdot \varepsilon \cdot E^2$) between the light intensity I and the electric field intensity E. That is, the intensity of the interference light between the scattered light and the reference light is proportional to the third power to the ratio of the particle size, from the relational expression ($I_i \propto E_r \cdot E_{D0} (D1/D0)^3$) between the particle size and the intensity of the interference light $I_i$. Thus, when the particle size is reduced, the decrease in intensity of the light can be made smaller by detecting the interference light than by detecting the scattered light directly. Herein, D0 and D1 are particle sizes, Er is the electric field intensity of the reference light, and EDO is the electric field intensity of the scattered light from the particle D0.

The difference between the maximum value and the minimum value of the intensity of the interference light between the scattered light and the reference light (the interference light intensity difference=2·c·εEs·Er·unit area between when the phase difference between the scattered light and the reference light is zero and when the phase difference is 180 degrees) is proportional to the product of the electric field intensity Er of the reference light and the electric field intensity Es of the scattered light. Accordingly, by increasing the intensities of the scattered light and reference light, a sufficiently strong interference light can be obtained. As a result, it is possible to obtain a detection signal having a sufficiently large amplitude. The intensity of the reference light is set to a value at which the detection signal can be processed properly, in accordance with the dynamic ranges of the detector 4, the filter 5, and the counting unit 6.

For example, if the scattered light intensity Is of a particle with a particle size of 20 nm is $7.0 \times 10^{-6}$ μW, the scattered light intensity Is is converted into a scattered light intensity Is/a per unit area, and, from the relational expression (Is/a=$0.5 \cdot c \cdot \varepsilon \cdot Es^2$) of the light intensity and the electric field intensity, the electric field intensity Es of the scattered light is determined to be approximately $5.8 \times 10^{-3}$ V/m. On the other hand, if the reference light intensity Ir is 1.2 μW, the electric field intensity Er of the reference light becomes approximately 2.4 V/m. When the scattered light and the reference light interfere with each other in an entire wavefront area, the difference in interference light intensity becomes approximately 1600 times the scattered light intensity, or approximately $1.2 \times 10^{-2}$ μW, indicating an amplification to the same level as the scattered light intensity of a particle with a particle size of 70 nm. Herein, c is the speed of light (m/s), and ε is the permittivity of air (F/m).

The filter 5 performs, with respect to the detection signal Vo generated by the detector 4, a filtering for passing a frequency component corresponding to the intensity change of the interference light. In this embodiment, the filter 5 is a bandpass filter which attenuates frequency components other than the frequency component corresponding to the intensity change of the interference light. In the bandpass filter, a pass band is set so as to pass the frequency component of the detection signal Vo corresponding to the fluid speed (i.e., the rate of movement of the particles) in the flow passage 2a (i.e., the frequency component corresponding to the intensity change of the interference light), and so as to attenuate frequency components other than the frequency component corresponding to the rate of travel of the fluid. In this way, a noise component in the detection signal Vo is attenuated, and the S/N ratio of the detection signal Vo increases. The pass band frequency is specified in advance from the rate of movement of the particles, the wavelength of the measurement light (i.e., the wavelength of the light source 1) and the like. When the noise frequency is higher than the frequency corresponding to the intensity change of the interference light, a low-pass filter may be used. When the noise frequency is lower than the frequency corresponding to the intensity change of the interference light, a high-pass filter may be used.

The counting unit 6 performs particle counting based on the detection signal Vo during the measurement period. In this embodiment, the counting unit 6 performs particle counting based on a detection signal Vo1 after the filtering performed by the filter 5. The counting unit 6 also detects the reciprocating operation of the movable reflective surfaces 43, 44 by the slider 45, and identifies the measurement period.

For example, the counting unit 6, upon detecting a successive alternating-current component (i.e., a frequency component corresponding to the intensity change of the interference light) in the period in the detection signal Vo, compares the amplitude of the alternating-current component with a predetermined threshold value which is determined for each particle size. The counting unit 6 counts individual particles separately for each particle size.

In the first embodiment, as illustrated in FIG. 5, the two movable reflective surfaces 43, 44 are moved due to the operation of the slider 45 in the optical path length variable unit 31. Accordingly, the lengths of the two optical path intervals 51, 52 change. For example, in the optical path length variable unit 31, the number of the optical path intervals of which the length changes due to the operation of the slider 45 is an optical path interval multiple B. In this case, in the optical path length variable unit 31 illustrated in FIG. 5, B=2. That is, the first optical path length changes at a rate twice the rate of movement of the movable reflective surfaces 43, 44 due to the slider 45. The optical path interval multiple B is normally 2 or more (such as an even number). The optical path interval multiple B, however, may be 1.

The slider 45 causes the movable reflective surfaces 43, 44 to be moved from the reference position during the measurement period. The slider 45 also, during a non-measurement period (a period between one measurement period and the next measurement period), returns the movable reflective surfaces 43, 44 back to the reference position. In this way, the slider 45 causes the movable reflective surfaces 43, 44 to reciprocate.

The "predetermined rate" is set based on the flow velocity of the fluid in the flow cell 2, the frequency characteristics of the light receiving elements 21a, 21b, and the frequency characteristics of the amplifiers 22a, 22b.

Specifically, the "predetermined rate" is set in accordance with the flow velocity in such a way that the frequency of the detection signal of the interference light becomes lower than the frequency of the lower value of two upper-limit values, one being an upper limit value of the response frequency of the light receiving elements 21a, 21b, and the other being an upper-limit value of the frequency to obtain a predetermined amplification rate in the frequency characteristics of the amplifiers 22a, 22b (i.e., the frequency characteristics of amplification rate).

For example, the central flow velocity in the flow cell 2 is Vm, the refractive index of the fluid is ri, the wavelength of the light source 1 in vacuum is λ, and the operation rate of the slider 45 (i.e., the rate of movement of the movable reflective surfaces 43, 44) is Vs. In this case, the frequency σ of the detection signal due to the interference light is expressed by the following expression.

$$\sigma = |Vm \times ri - Vs \times B|\lambda$$

For example, as long as the frequency upper-limit value of the amplifiers 22a, 22b is of the order of 120 kHz, the operation rate Vs of the slider 45 and the optical path interval multiple B are set based on the flow velocity Vm and the fluid refractive index ri so that the frequency σ of the detection signal becomes lower than or equal to 120 kHz.

The operation of the particle counter according to the first embodiment will be described.

The light source 1 emits laser light. The beam splitter 11 branches the laser light into measurement light and reference light. The reference light is attenuated by the attenuator 14, and then enters the beam splitter 17 as approximately parallel light, via the mirror 15 and the beam expander 16.

On the other hand, the measurement light is caused by the irradiation optical system 12 to enter the detection area in the flow cell 2 via the optical path length variable unit 31. As a particle passes through the detection area, scattered light from the particle is emitted in the period in which the particle is passing through the detection area. The detection optical system 13 causes the scattered light being emitted in the traveling direction of the fluid in the flow passage 2a of the flow cell 2 to enter the beam splitter 17 as approximately parallel light.

Thus, in the period in which the particle passes through the detection area, the reference light and the scattered light from the particles are made to enter the beam splitter 17. The beam splitter 17 emits the interference lights resulting from the interference between the scattered light and the reference light.

In the period in which the particle is passing through the detection area, the interference light emitted from the beam splitter 17 is received by each of the light receiving elements 21a, 21b. An electric signal corresponding to the intensity of the interference light is output from the detector 4 as the detection signal Vo. In particular, in the first embodiment, the detection signal Vo based on the difference between the first interference light and the second interference light having mutually opposite phases is generated. Accordingly, the detection signal Vo having an alternating-current component with an amplitude approximately twice that of the electric signals V1, V2 is obtained.

Figure 8:
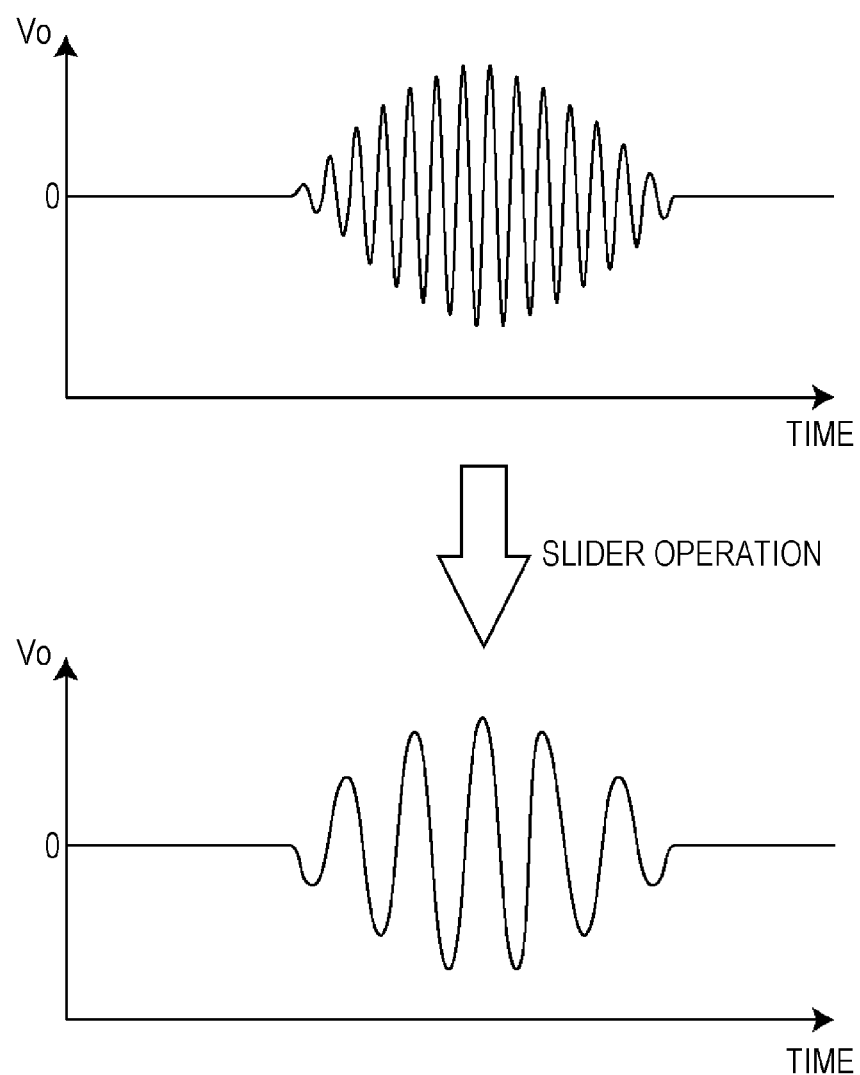
FIG. 8 is a diagram for describing a detection signal frequency change due to a change in optical path length.

During the measurement period, the slider 45 of the optical path length variable unit 31 operates at a certain speed and changes the optical path length of the measurement light to become greater. In this way, compared to when the slider 45 is stationary, it is possible to decrease the rate of change in the phase difference between the phase of the scattered light due to the particles and the phase of the reference light. Similarly, it is possible to decrease the rate of change in phase difference by changing the second optical path length of the reference light to become shorter, using the optical path length variable unit 31. FIG. 8 is a diagram for describing a detection signal frequency change due to a change in optical path length. When the rate of change in phase difference is decreased, the intensity change of the interference light becomes slower, and the frequency of the detection signal Vo becomes lower, as illustrated in FIG. 8.

During each measurement period, the counting unit 6 performs particle counting based on the detection signal Vol after the filtering performed by the filter 5.

As described above, according to the particle counter of the first embodiment, the irradiation optical system 12 irradiates the fluid in the flow passage 2a, in a direction different from the direction in which the fluid flows, with one of a plurality of lights obtained by branching the light from the light source 1, thereby forming the detection area. The detection optical system 13 causes, among the scattered light from the particles included in the fluid in the detection area, scattered light in a direction different from the optical axis of the irradiation optical system 12 to enter the beam splitter 17. Meanwhile, the beam expander 16 causes another light among the plurality of lights to enter the beam splitter 17 as the reference light. The detector 4 receives, using a light receiving element, the interference light between the scattered light and the reference light obtained by the beam splitter 17, and generates a detection signal corresponding to the interference light. The counting unit 6 performs particle counting based on the detection signal (herein, the detection signal that has passed through the filter 5) during the measurement period. The optical path length variable unit 31 decreases the rate of change in the optical path difference between the first optical path length of the optical path of the first light and the scattered light and the second optical path length of the optical path of the second light, and, during the measurement period, causes at least one of the first optical path length and the second optical path length to be changed at a predetermined rate so as to decrease the rate of change in the phase difference between the phase of the scattered light due to the particles and the phase of the reference light.

In this way, the rate of intensity change of the interference light is decreased by the optical path length variable unit 31. As a result, the frequency of the detection signal becomes lower. Accordingly, even when the flow velocity of the sample fluid is made relatively high, it is possible to perform accurate particle counting while suppressing a decrease in the amplitude level of the detection signal due to the frequency characteristics of the light receiving element and the amplifier.

Second Embodiment

Figure 9:
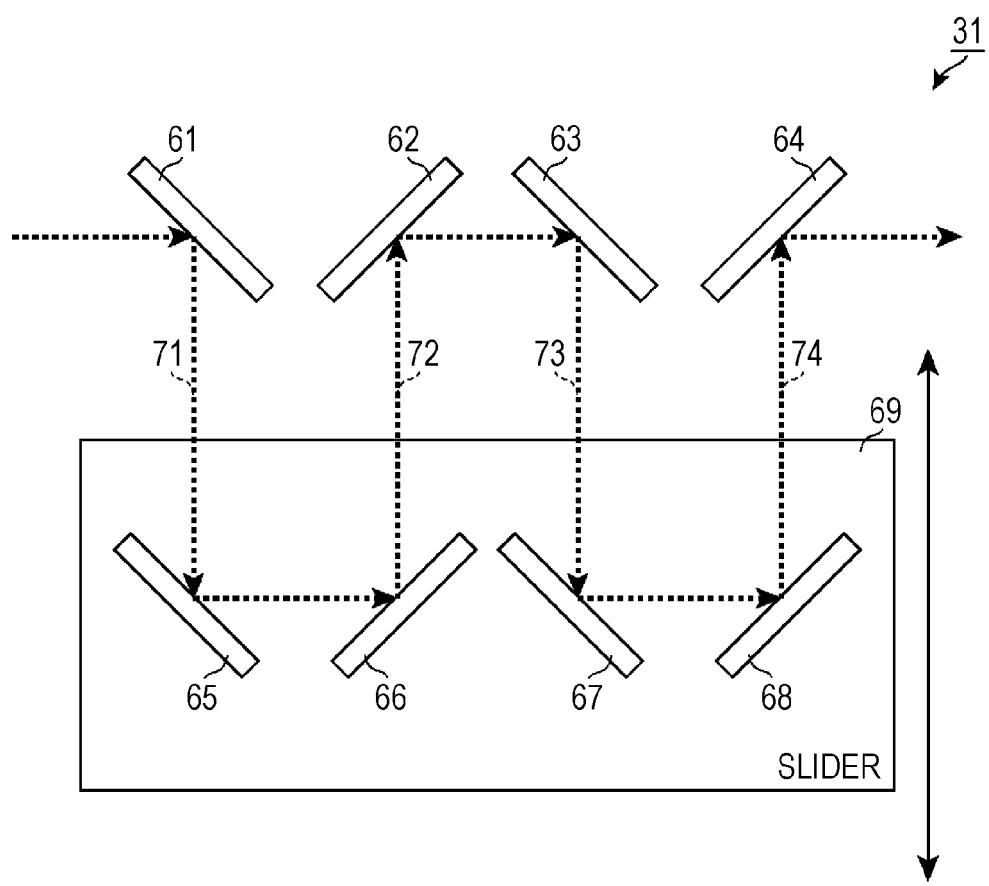
FIG. 9 illustrates an example of an optical path length variable unit in a particle counter according to a second embodiment.

FIG. 9 illustrates an example of the optical path length variable unit 31 in a particle counter according to a second embodiment. As illustrated in FIG. 9, in the second embodiment, the optical path length variable unit 31 is provided with four fixed reflective surfaces 61 to 64 arranged in the first optical path, and a slider 69 having four movable reflective surfaces 65 to 68. The slider 69, during the measurement period, causes the four movable reflective surfaces 65 to 68 to be moved such that the first optical path length is changed at a predetermined rate.

Accordingly, in the optical path length variable unit 31 illustrated in FIG. 9, there are four optical path intervals 71 to 74 (i.e., B=4) of which the length changes due to the operation of the slider 69. Compared to the optical path length variable unit 31 (B=2) illustrated in FIG. 5, the following advantages (a) to (c) are obtained.

(a) The operation rate+V of the slider 69 for obtaining the same rate of change in the first optical path length is half the operation rate+V of the slider 45.

(b) The width of the range of movement of the slider 69 for obtaining the same length of measurement period is half the width of the range of movement of the slider 45.

(c) The rate of the sample fluid can be made higher.

In the second embodiment, each of the fixed reflective surfaces 61 to 64 and the movable reflective surfaces 65 to 68 is formed of a flat-plate mirror member.

The slider 69, during the measurement period, causes the movable reflective surfaces 65 to 68 to be moved from a reference position. Further, the slider 69, during a non-measurement period, returns the movable reflective surfaces 65 to 68 back to the reference position. In this way, the slider 69 causes the movable reflective surfaces 65 to 68 to reciprocate.

Description of the other configurations and operations of the particle counter according to the second embodiment will be omitted as they are similar to those of the first embodiment.

Third Embodiment

Figure 10:
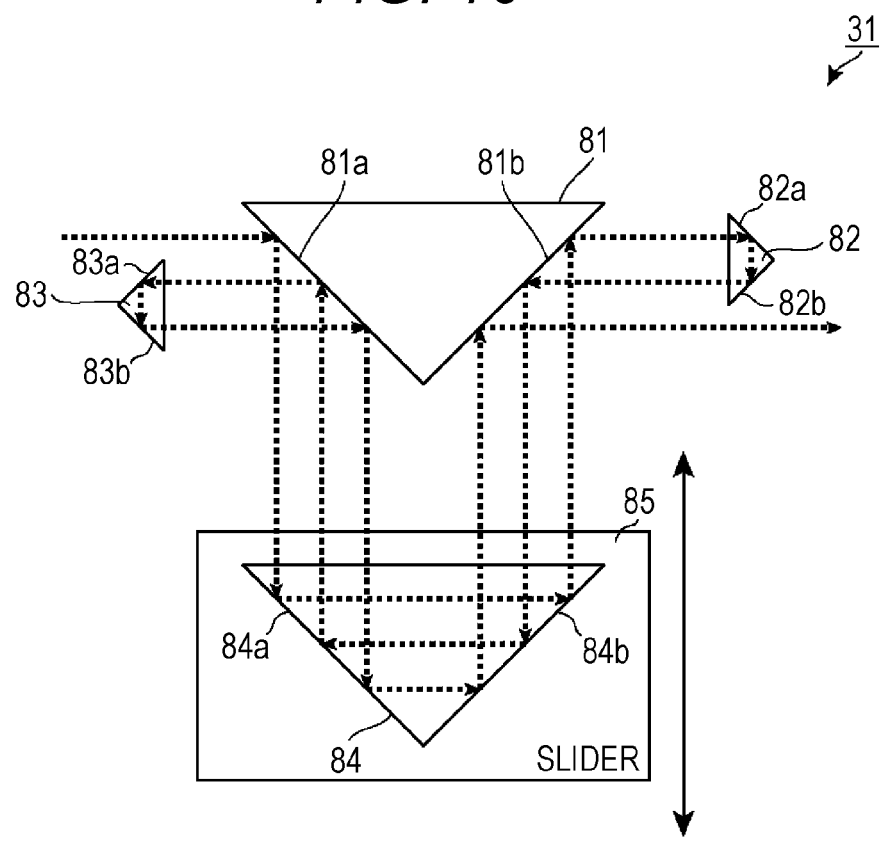
FIG. 10 illustrates an example of an optical path length variable unit in a particle counter according to a third embodiment.

FIG. 10 illustrates an example of the optical path length variable unit 31 in a particle counter according to a third embodiment. As illustrated in FIG. 10, in the third embodiment, the optical path length variable unit 31 is provided with four right-angle prisms 81 to 84 and a slider 85. The right-angle prisms 81 to 83 include six fixed reflective surfaces 81a, 81b, 82a, 82b, 83a, 83b arranged in the first optical path. The right-angle prism 84 includes two movable reflective surfaces 84a, 84b arranged in the first optical path. The slider 85, during the measurement period, causes the movable reflective surfaces 84a, 84b (i.e., the right-angle prism 84) to be moved such that the first optical path length is changed at a predetermined rate.

That is, in the third embodiment, the measurement light reciprocates a plurality of times (three reciprocations in FIG. 10) while being totally reflected between the right-angle prism 81 and the right-angle prism 84. In this way, the optical path interval multiple B is increased (in FIG. 10, B=6).

The fixed reflective surfaces 81a, 81b, 82a, 82b, 83a, 83b and the movable reflective surfaces 84a, 84b are arranged such that the incident angle of the measurement light with respect to each of the reflective surfaces becomes 45 degrees.

Description of the other configurations and operations of the particle counter according to the third embodiment will be omitted as they are similar to those of the first embodiment.

Fourth Embodiment

In the first to third embodiments, the optical path length variable unit 31 is disposed in the first optical path. In a fourth embodiment, the optical path length variable unit 31 is disposed in the second optical path (i.e., on the reference light side), or in both the first optical path and the second optical path.

When the optical path length variable unit 31 is disposed in the second optical path, the fixed reflective surfaces and the movable reflective surfaces are arranged in the second optical path. The optical path length variable unit 31 decreases the second optical path length during the measurement period, contrary to the first to third embodiments, in which the optical path length variable unit 31 is disposed in the first optical path.

When the optical path length variable unit 31 is disposed in both the first optical path and the second optical path, the optical path length variable unit 31 disposed in the first optical path increases the first optical path length during the measurement period. On the other hand, the optical path length variable unit 31 disposed in the second optical path decreases the second optical path length during the measurement period.

Description of the other configurations and operations of the particle counter according to the fourth embodiment will be omitted as they are similar to those of any of the first to third embodiments.

Those skilled in the art will readily appreciate that various modifications and changes may be made to the foregoing embodiments without departing from the spirit and scope of the subject matter of the present disclosure, and without diminishing the intended advantages. It is therefore intended that such modifications and changes be included in the appended claims.

For example, the foregoing first to fourth embodiments include the beam expander 16 at the optical path for the reference light. Instead or additionally, a beam expander may be disposed at a preceding stage of the beam splitter 11. In the first to fourth embodiments, the one mirror 15 is used as illustrated in FIG. 1. Instead, three mirrors may be used to adjust three-dimensionally the direction of the optical path. In addition, in the first to fourth embodiments, the scattered light from the particles and the reference light are superimposed by the use of the beam splitter 17. Instead, a polarization prism may be used.

Preferably, in the first to fourth embodiments, the light source 1 is a light source that emits high-coherent laser light in single longitudinal mode. It is also preferable to use a light source having an energy distribution such that, in any position of the detection area, interference occurs between the scattered light from the particles and the reference light. The light source 1 is not limited to a light source that emits laser light and may be configured to emit light other than laser light, such as LED light. The light source 1 may be configured to emit light such that an optical path length difference between the reference light side and the particle scattered light side (i.e., the maximum value of the optical path length difference when the optical path length has been changed by the optical path length variable unit 31) is within the coherent length of the light emitted from the light source 1.

In the first to fourth embodiments, the filter 5 and the counting unit 6 may be analog circuits or digital circuits. When the filter 5 and the counting unit 6 are digital circuits, an analog-digital conversion is performed with respect to the detection signal Vo in a stage prior to the filter 5.

In the first to fourth embodiments, as illustrated in FIG. 1, a so-called Mach-Zehnder interference optical system in which the branching of light and the superimposition of light are performed by the different beam splitters 11 and 17 is employed. Instead, a Michelson or any other types of interference optical system may be used.

In the first to fourth embodiments, as illustrated in FIG. 3, detection is implemented from the traveling direction of the fluid in the detection area. Alternatively, detection may be implemented from the opposite direction from the traveling direction of the fluid in the detection area. Further, detection may be implemented by reversing the traveling direction of the fluid. In this case, in the optical path length variable unit, contrary to the operation of the optical path length variable unit 31 in the first to fourth embodiments, the optical path length variable unit 31 disposed in the first optical path decreases the first optical path length during the measurement period. The optical path length variable unit 31 disposed in the second optical path increases the second optical path length during the measurement period.

In addition, the particle counters according to the first to fourth embodiments are liquid-borne particle counters. The particle counters according to the first to fourth embodiments may be applied to airborne particle counters.

The embodiments of the present disclosure may be applied to a particle counter.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A particle counter comprising:
   a light source that emits light;
   a light superimposing unit that spatially superimposes two lights;
   an irradiation optical system that forms a detection area by irradiating a fluid flowing in a flow passage with a first light among a plurality of lights obtained by branching the light from the light source;
   a detection optical system that causes scattered light, among scattered light from a particle included in the fluid in the detection area, that is in a direction different from an optical axis of the irradiation optical system to enter the light superimposing unit;
   a reference optical system that causes a second light among the plurality of lights to enter the light superimposing unit as reference light;
   a detector that receives, using a light receiving element, interference light between the scattered light and the reference light obtained by the light superimposing unit, generates a detection signal corresponding to the interference light, and amplifies the detection signal using an amplifier;
   a counting unit that performs counting of the particle, based on the detection signal in a measurement period for measuring the particle; and
   an optical path length variable unit that causes the optical path length of at least one of a first optical path which is an optical path of the first light and the scattered light and a second optical path which is an optical path of the second light to be changed at a predetermined rate,
   wherein the predetermined rate is set based on a flow velocity of the fluid so as to slow a change in a phase difference between the scattered light and the reference light and to make the frequency of the detection signal lower by changing the optical path length.

2. The particle counter according to claim 1, wherein
   the optical path length variable unit includes a fixed reflective surface arranged in the first optical path or the second optical path, and a slider that causes a movable reflective surface to be moved, during the measurement period, by arranging the movable reflective surface in such a way that the optical path length is changed at the predetermined rate.

3. The particle counter according to claim 2, wherein:
   the slider causes the movable reflective surface to reciprocate by causing the movable reflective surface to be moved from a reference position during the measurement period, and by returning the movable reflective surface back to the reference position during a non-measurement period; and
   the counting unit performs the counting of the particle during the measurement period, and does not perform the counting of the particle during the non-measurement period.

4. The particle counter according to claim 3, wherein
   the predetermined rate is further set based on a frequency characteristic of the light receiving element and a frequency characteristic of the amplifier.

5. The particle counter according to claim 2, wherein
   the predetermined rate is further set based on a frequency characteristic of the light receiving element and a frequency characteristic of the amplifier.

6. The particle counter according to claim 1, wherein
   the predetermined rate is further set based on a frequency characteristic of the light receiving element and a frequency characteristic of the amplifier.

* * * * *